UNITED STATES PATENT OFFICE.

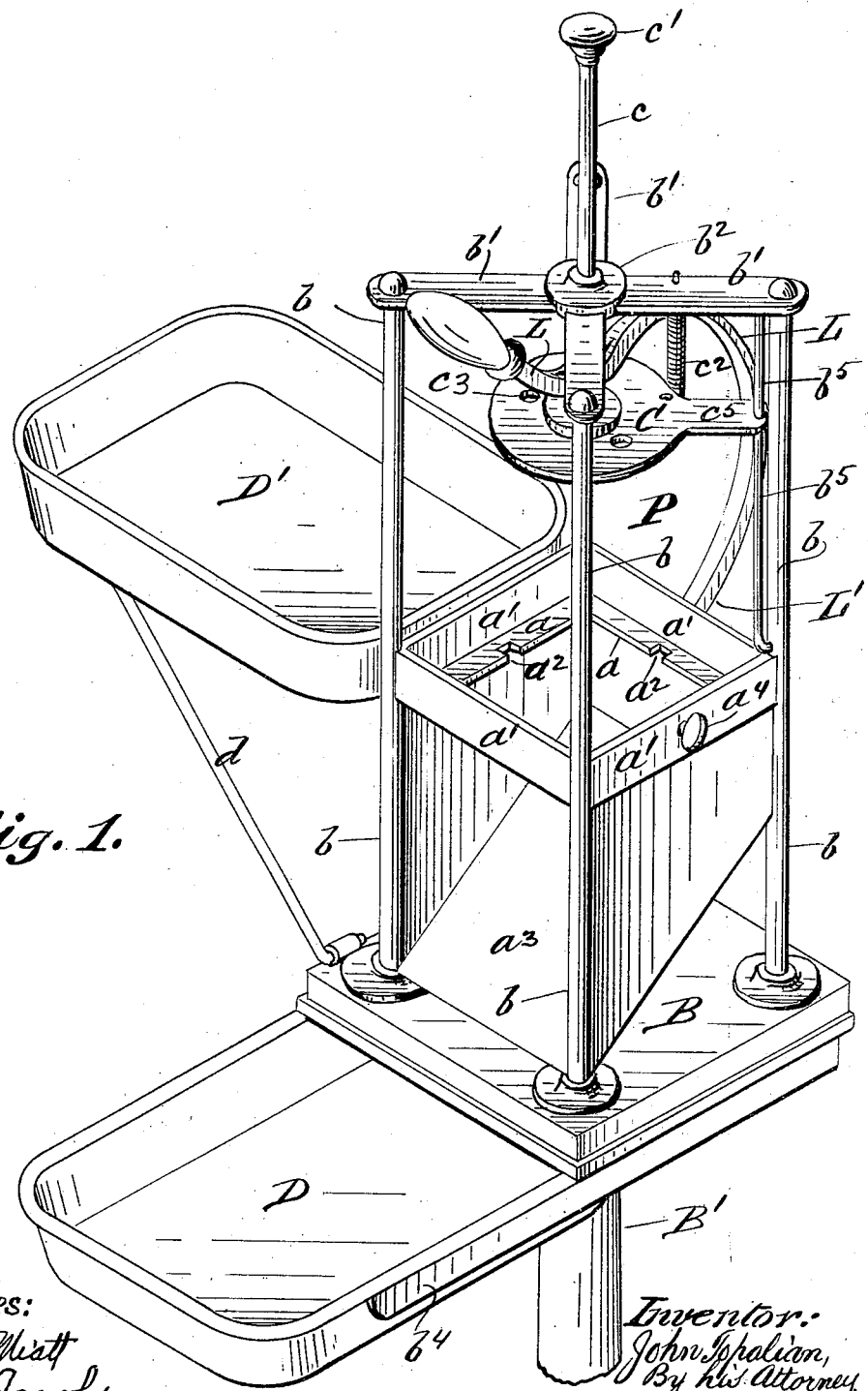

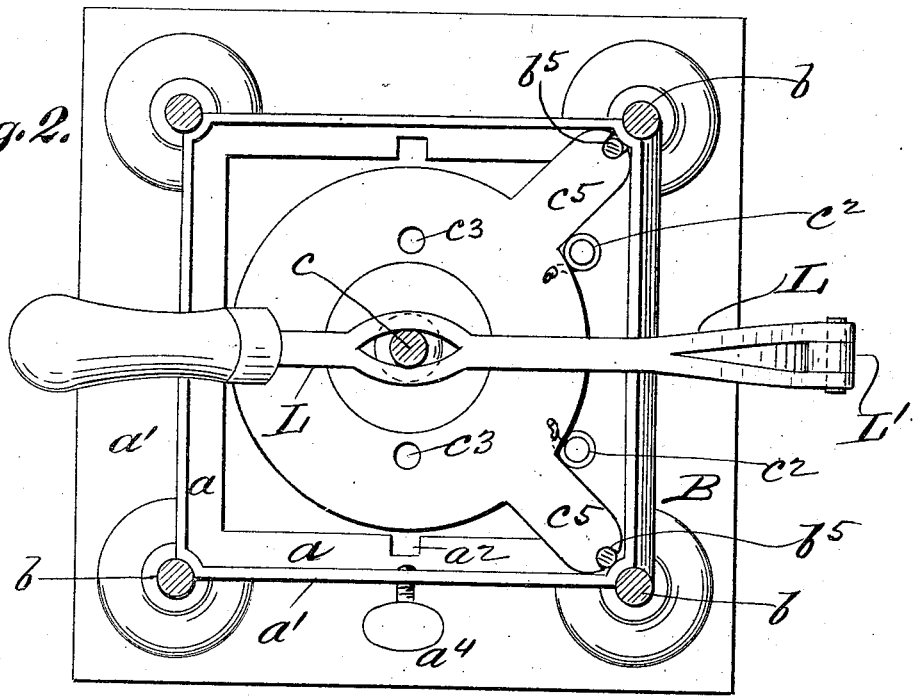
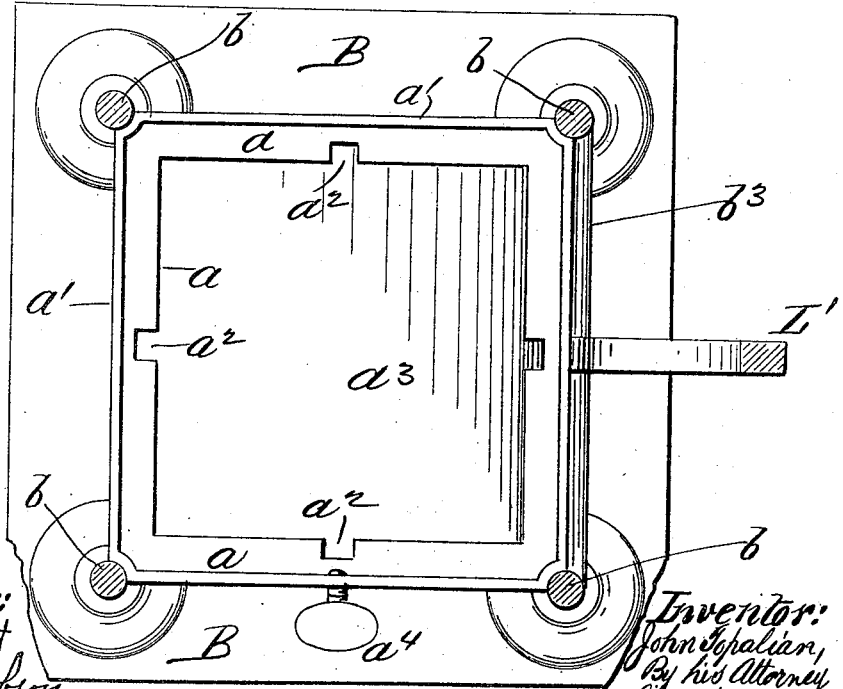

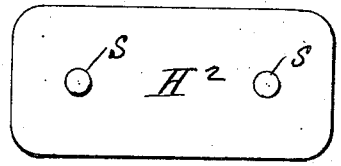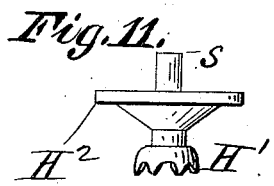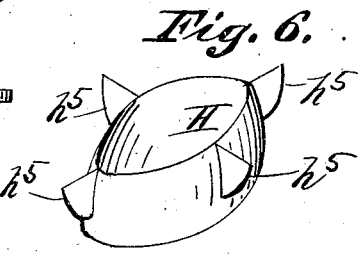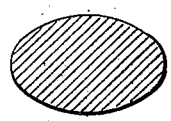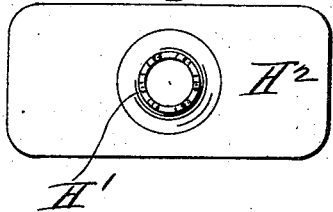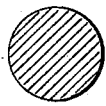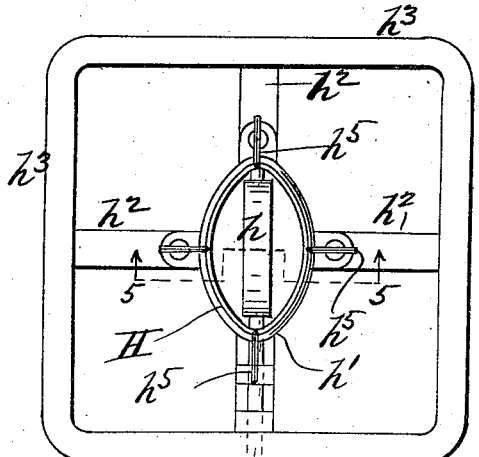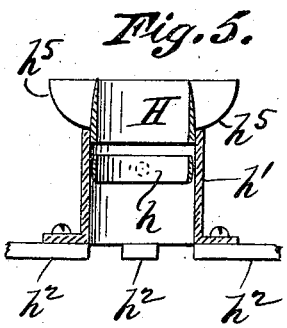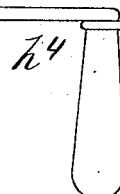

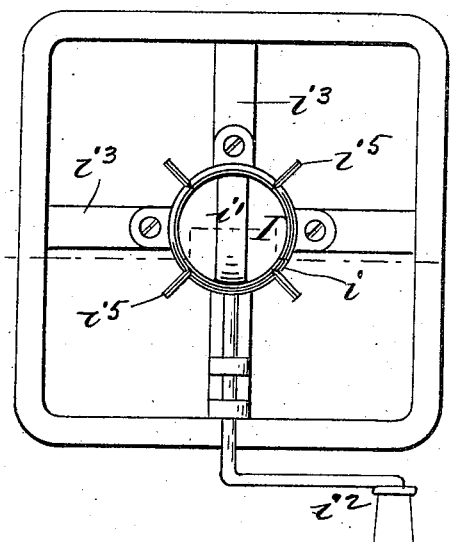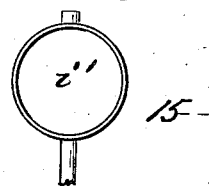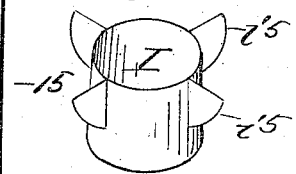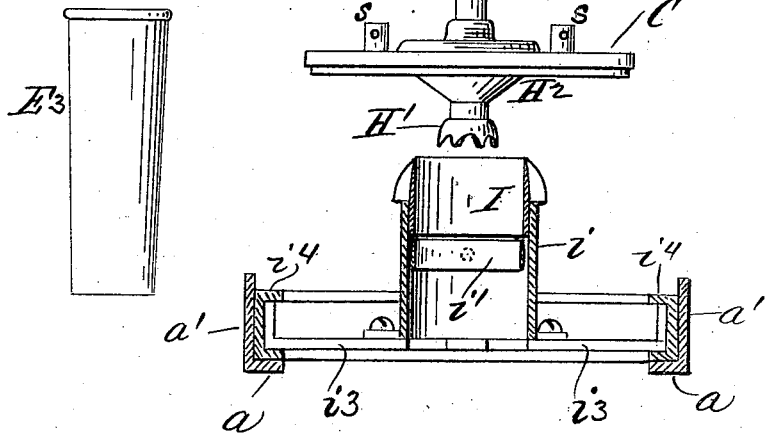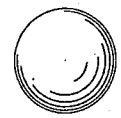

JOHN TOPALIAN, OF NEW YORK, N. Y.

VEGETABLE-CUTTING APPARATUS.

1,263,153. Specification of Letters Patent. Patented Apr. 16, 1918.

Original application filed March 16, 1917, Serial No. 155,167. Divided and this application filed October 6, 1917. Serial No. 195,010.

*To all whom it may concern:*

Be it known that I, JOHN TOPALIAN, a subject of the Sultan of Turkey, and a resident of the borough of Manhattan, city, county, and State of New York, have invented certain new and useful Improvements in Vegetable-Cutting Apparatus, of which the following is a specification.

My invention relates to means for cutting and shaping vegetables as set forth in my concurrent application Serial No. 155,167, filed March 16, 1917, of which the present application is a subdivision appertaining more particularly to the dies, etc., used for the formation of "château" and "rissolee" potatoes and similar products, the invention consisting in the specific construction and arrangement of parts described and claimed and a distinctive feature being the use of a stationary hollow cutter die in conjunction with a rotatable cutter positioned therein, as hereinafter fully set forth.

In the accompanying drawings,

Figure 1, is an isometrical perspective of a hand press adapted to the practical requirements of my invention;

Fig. 2, is a horizontal section thereof taken on a plane immediately below the cross head which unites the upper ends of the corner standards, and looking downward;

Fig. 3, is a horizontal section taken on a plane immediately below the pusher head, and also looking downward;

Fig. 4, is a plan of the female die for cutting ellipsoidal forms;

Fig. 5, is a section taken upon planes of line 5—5, Fig. 4;

Fig. 6, is a perspective view of the elliptical cutter die cap;

Fig. 7, is a view of the rotary ellipsoidal cutter;

Fig. 8, is a top view of the potato holder and pusher used in conjunction with the ellipsoidal die;

Fig. 9, is a side view thereof;

Fig. 10, is a view of the under side thereof;

Fig. 11, is an end view thereof;

Fig. 12, is a central longitudinal section of the ellipsoidal product;

Fig. 13, is a transverse central section thereof;

Fig. 14, is a top view of the spheroidal cutter die;

Fig. 15, is a sectional view taken upon plane of line 15—15, Fig. 14, and showing the spheroidal die seated on the die support of the apparatus, and also showing in elevation the potato holder and pusher;

Fig. 16, is an isometrical perspective of the circular die cap;

Fig. 17, is a view of the spheroidal cutter;

Fig. 18, is an edge elevation of the cylindrical core cutter;

Fig. 19, is a side elevation thereof;

Fig. 20, is a view of the spheroidal product.

The press P, is mounted upon a suitable table or base B, supported upon a leg or pedestal B′, or in any other suitable manner. Rigidly attached to the base B, are four standards $b$, $b$, united integrally at top by a cross head $b'$. Rigidly attached to and between the standards $b$, $b$, and intermediate between the base B, and the cross head $b'$, is the seat for the support of the female dies used in shaping the potato or other vegetable products. For convenience I shall hereinafter confine my description to the formation and manipulation of potato products with the understanding that I am not limited thereto, since other vegetables may be so treated as before stated.

The female die seat consists essentially of the horizontal flanges $a$, and vertical walls or flanges $a'$, the horizontal flanges $a$, being formed with notches or recesses $a^2$, for the purpose hereinafter set forth.

C, is the platen on the under side of which the male dies, forwarders, and strippers are mounted as required for use. This platen member C, is rigidly attached to the lower end of a push rod $c$, slidably mounted in the central bearing $b^2$, on the cross head $b'$, as shown more particularly in Fig. 1, the upper extremity of the said rod $c$, being provided with a knob or handle $c'$, by which it may be depressed manually if desired against the resistance of retractile springs $c^2$, $c^2$, (see Figs. 1 and 2) attached to the cross head $b'$, and to the platen member C. The platen member C, may also be depressed against the resistance of said retractile springs $c^2$, $c^2$, by means of a hand lever L, or equivalent mechanical expedient. The hand lever L, shown is fulcrumed on a link lever L′, in turn fulcrumed on a rear cross rod $b^3$, (Fig. 3) so that the compound lever L, L′, thus formed, can adapt itself readily to the vertical movement of the platen C, and rod $c$, which latter the hand lever L, straddles as shown in Fig. 2. Thus the depression of the hand lever L, forces the platen C, downward against the resistance of the springs $c^2$, which tend constantly to maintain said platen C, in its highest position above the die seat $a$ $a'$.

Below the female die seat $a$, $a'$, the space between the standards $b$, is inclosed at the rear and sides, and is formed with an inclined chute $a^3$, which directs the material from the dies to a receptacle D, supported for the purpose on arms $b^4$, (one of which is shown in Fig. 1) on either side of the table B. D', is a supply pan in which the potatoes may be stored temporarily in convenient position for introduction by hand into the press P,—said supply pan D', being supported on bracket rods $d$, (one of which is shown in Fig. 1) or in any other desired or convenient manner.

$c^3$, $c^3$, are holes or sockets formed in the platen C, for the reception of the suspender studs $s$, $s$, on the back plates of the several male dies, etc., said suspender studs $s$, $s$, being formed with transverse holes $s'$, $s'$, for the reception of coupling pins $c^4$, $c^4$, by means of which said back plates may be secured to the under side of the platen C.

$a^4$, is a binding screw for holding the female dies rigidly on the seat $a$, $a'$, when desired. The platen C, is formed with arms $c^5$, $c^5$, the ends of which straddle the guide rods $b^5$, $b^5$, so as to prevent said platen from turning on its axis.

The "château" or ellipsoidal form of potato product shown in longitudinal section in Fig. 12, and in cross section in Fig. 13, is formed by pressing the body of a potato through the elliptical die H, Figs 4, 5, and 6, mounted on the top of the die tube $h'$, and then subjecting it to the action of the rotable cutter $h$, of elliptical form, mounted in said die tube $h'$, which is supported on the bracket arms $h^2$, $h^2$, projecting inward from the die frame $h^3$, which is adapted to fit into the seat $a$, $a'$, of the press. The elliptical cutter $h$, is rotated by means of a hand crank $h^4$, and the elliptical die H, is formed with radial blades $h^5$, $h^5$, which sever the portion of the potato beyond the elliptical edge of said die H, so that the "trim" will drop clear of the die and tube $h'$, and through the frame $h^3$, and seat $a$, $a'$, onto the chute $a^3$.

The potato is pressed against the elliptical female die or cutter H, by means of a holder H', mounted on the under side of a back plate H², provided with the usual suspender studs $s$, $s$, for attachment to the press platen C as heretofore set forth. The elliptical blank of potato cut out by the die H, remains therein until forced into the tube $h'$, and rotatable elliptical cutter $h$, by the next succeeding potato blank formed by the die H. A turn or two of the handle $h^4$, is sufficient to trim the blank into perfect ellipsoidal form, when it drops through frame $h^3$, and press seat $a$, $a'$, to the delivery chute $a^3$.

The same holder H', H², is used in the formation of "rissolee" or globular potato, "potato balls;" and the construction and operation of the parts is essentially the same as just described in connection with ellipsoidal or "château" potato, except that the cutter die I, (Figs. 14, 15, 16, and 17) is circular instead of elliptical. Thus the cutter die I, fits into and is supported upon the upper end of the tube $i$, in which the circular rotatable cutter $i'$, is mounted,—said cutter $i'$, being rotated by means of the crank handle $i^2$. The tube $i$, is supported on bracket arms $i^3$, projecting inward from the frame $i^4$, which is adapted to fit in the seat $a$, $a'$, of the press. The cutter die I, is likewise formed with radial cutter blades $i^5$, which sever the part of the potato beyond the cylindrical core or blank formed by said cutter die I, and the succeeding blank forces the preceding one into the tube $i$, from which it emerges in the form of a perfect sphere, as indicated in Fig. 20.

It is to be noted that the female die seat $a$, $a'$, is wide open centrally, so that while it affords ample support for the dies, the shaped potato products and the resultant trimmings are free to descend to the chute $a^3$. Also that the pressure on the reciprocatory platen C, and consequently on the male dies, etc., is entirely within the control of the operator, and that the retractile movement of said platen is automatic.

The hollow hand-cutter E³, shown in Figs. 18 and 19, may be used to effect a preliminary cutting of the potato into cylindrical form for subjection to the action of the rotary cutter $i'$.

What I claim as my invention and desire to secure by Letters Patent is,

1. Vegetable cutting apparatus of the character designated, comprising a press having a centrally open female die seat, a reciprocating platen mounted in operative relation thereto, a female die mounted on said press seat and formed with a hollow cutter and with a rotatable cutter mounted in said hollow cutter, and a pusher positioned on the under side of the platen, for the purpose described.

2. Vegetable cutting apparatus of the character designated, comprising a press having a centrally open female die seat, a reciprocatory platen mounted in operative relation thereto, a female die member mounted on said press seat and provided with an elliptical stationary cutter and a rotatable elliptical cutter, and a pusher positioned on the under side of said platen, for the purpose described.

3. Vegetable cuttting apparatus of the character designated, comprising a press having a centrally open female die seat, a reciprocatory platen mounted in operative relation thereto, a female die member mounted on said press seat and provided with a stationary elliptical cutter formed with radially projecting blades and seated in the upper end of an elliptical tube, said elliptical tube, a rotatable elliptical cutter positioned in said elliptical tube, and a pusher mounted upon the under side of said platen, for the purpose described.

4. Vegetable cutting apparatus of the character designated, comprising a press having a centrally open female die seat, a reciprocatory platen mounted in operative relation thereto, a female die member mounted on said press seat and provided with a circular stationary cutter and a rotatable circular cutter, and a pusher positioned on the under side of said platen, for the purpose described.

5. Vegetable cutting apparatus of the character designated, comprising a press having a centrally open female die seat, a reciprocatory platen mounted in operative relation thereto, a female die member mounted on said press seat and provided with a stationary circular cutter formed with radially projecting blades and seated in the upper end of a cylindrical tube, said cylindrical tube, a rotatable circular cutter positioned in said cylindrical tube, and a pusher mounted upon the under side of said platen, for the purpose described.

JOHN TOPALIAN.

Witnesses:
GEO. WM. MIATT,
DOROTHY MIATT.